United States Patent
Ge et al.

(10) Patent No.: US 10,778,105 B2
(45) Date of Patent: Sep. 15, 2020

(54) INTERLEAVED DC-DC CONVERTER FOR ELECTRIFIED VEHICLES

(71) Applicant: FORD GLOBAL TECHNOLOGIES, LLC, Dearborn, MI (US)

(72) Inventors: Baoming Ge, Okemos, MI (US); Lihua Chen, Farmington Hills, MI (US); Fan Xu, Novi, MI (US); Shuitao Yang, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 473 days.

(21) Appl. No.: 15/837,315

(22) Filed: Dec. 11, 2017

(65) Prior Publication Data

US 2019/0181766 A1  Jun. 13, 2019

(51) Int. Cl.
*H02M 3/335* (2006.01)
*H02M 1/14* (2006.01)
(Continued)

(52) U.S. Cl.
CPC ......... *H02M 3/33576* (2013.01); *B60L 50/51* (2019.02); *H02M 1/14* (2013.01);
(Continued)

(58) Field of Classification Search
CPC .. H02M 3/33576; H02M 3/1584; H02M 1/14; H02M 2003/1586; H02M 7/48;
(Continued)

(56) References Cited

U.S. PATENT DOCUMENTS

| 7,295,448 B2 | 11/2007 | Zhu |
| 7,518,886 B1 | 4/2009 | Lai et al. |

(Continued)

FOREIGN PATENT DOCUMENTS

| CN | 202840953 U | 3/2013 |
| EP | 2819290 A2 | 12/2014 |

OTHER PUBLICATIONS

Mohd Salauddin Parvez et al., An Interleaved Bi-Directional DC-DC Converter for Fuel-Cell fed Electric Vehicle Application, International Journal of Scientific Engineering and Technology Research, ISSN 2319-8885, vol. 04 Issue 21, Jul. 2015, pp. 3960-3966.

*Primary Examiner* — Jared Fureman
*Assistant Examiner* — Michael J Warmflash
(74) *Attorney, Agent, or Firm* — David B. Kelley; MacMillan, Sobanski & Todd, LLC

(57) ABSTRACT

A DC-DC voltage converter for an electric vehicle connects between a battery pack and a DC link having upper and lower link capacitors. When a target voltage on the link is less than twice the battery voltage, the capacitors are charged in series from two interleaved switching legs of the converter simultaneously for part of the time, and charged in series from only one of the switching legs for part of the time. When the target voltage is between 2 and 4 times the battery voltage, the upper capacitor is charged alone from both legs for part of the time, the upper capacitor is charged alone from only one of the legs for part of the time, the lower capacitor is charged alone from both legs for part of the time, and the lower capacitor is charged alone from only one of the legs for part of the time.

18 Claims, 12 Drawing Sheets

(51) Int. Cl.
  *H02M 3/158*  (2006.01)
  *B60L 50/51*  (2019.01)
  *H02M 7/48*   (2007.01)
  *H02M 1/00*   (2006.01)

(52) U.S. Cl.
  CPC ............ *H02M 3/1584* (2013.01); *H02M 7/48* (2013.01); *H02M 2001/007* (2013.01); *H02M 2003/1586* (2013.01)

(58) Field of Classification Search
  CPC .............. H02M 2001/007; B60L 50/51; B60L 2240/527; B60L 15/007; B60L 2210/14; B60L 2210/12
  See application file for complete search history.

(56) References Cited

U.S. PATENT DOCUMENTS

| | | |
|---|---|---|
| 8,213,188 B2 | 7/2012 | Tada et al. |
| 9,106,162 B2 | 8/2015 | Isayeva et al. |
| 9,413,271 B2 | 8/2016 | Vogel |
| 2019/0267888 A1* | 8/2019 | Ge ........................ H02M 1/084 |
| 2019/0366850 A1* | 12/2019 | Ge .......................... B60L 53/22 |
| 2019/0379296 A1* | 12/2019 | Ge ..................... H02M 7/53871 |
| 2020/0028434 A1* | 1/2020 | Ge ........................ H02J 7/0013 |

* cited by examiner

INTERLEAVED DC-DC CONVERTER FOR ELECTRIFIED VEHICLES

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to DC-DC converters in electric drive systems for electrified vehicles, and more specifically to an interleaved converter for providing reduced current ripple and increased current capability over an increased range of voltage gain.

Electric vehicles, such as hybrid electric vehicles (HEVs), plug-in hybrid electric vehicles (PHEVs), and battery electric vehicles (BEVs), use inverter-driven electric machines to provide traction torque. A typical electric drive system may include a DC power source (such as a battery pack or a fuel cell) coupled by contactor switches to a DC-DC converter (also known as a variable voltage converter, or VVC) to regulate a main bus voltage across a main DC linking capacitor. A 3-phase motor inverter is connected between the main buses and a traction motor in order to convert the DC bus power to an AC voltage that is coupled to the windings of the motor to propel the vehicle. During deceleration of the vehicle, the motor can be driven by the vehicle wheels and used to deliver electrical power to charge the battery during regenerative braking of the vehicle, wherein the DC-DC converter works in the opposite direction to convert the generated power to a voltage appropriate for charging the battery pack. In some vehicles, another 3-phase inverter may also be present to connect the DC bus to a generator which is driven by an internal combustion engine to charge the battery.

Using the appropriate modulation of the power switches, a VVC can operate in boost mode (converting to a higher voltage), buck mode (converting to a lower voltage), or pass-through mode (no change in voltage). For use in a hybrid electric vehicle driver system, the VVC is also configured to selectably provide bi-directional power flow.

The typical VVC includes at least one phase leg with upper and lower transistor switching devices (e.g., insulated gate bipolar transistors, IGBTs) connected in series across the DC link capacitor. An intermediate junction between the switching devices is connected to the source battery via an inductor. An electronic controller provides switching signals (i.e., gate signals) to turn the switching devices on and off according to a modulation scheme that provides the desired VVC mode. Pulse width modulation is typically used to control the stepping up of a voltage by the VVC, wherein a duty cycle of the switching signals can be varied in order to regulate the VVC voltage to a desired magnitude.

High-power/high-current DC-DC converters typically employ interleaved multiphase inputs in the converter (i.e., two or more parallel phase legs) in order to obtain a current rating higher than the current capacity of just one phase leg. In addition, an interleaved DC-DC converter greatly reduces battery current ripple. The inductors connecting each phase leg of an interleaved DC-DC converters to the battery pack can be independent inductors or they can be inductively coupled.

Even with the multiphase architecture, there continue to be voltage gain limitations. The gain is determined by a duty cycle D defined as $T_{on}/T_s$, where $T_{on}$ is the conduction duration of the lower switching device and $T_s$ is the switching period. Based on the duty cycle, the voltage gain G is determined by the formula $$G = \frac{V_{dc}}{V_b} = \frac{1}{(1-D)}.$$

The converter efficiency dramatically decreases with increasing the duty cycle D when voltage gain G is larger than two. Consequently, the voltage gain for conventional DC-DC converters has typically been limited to less than three. Higher voltage gains would be desirable to reduce motor inverter loss over a wide speed range operation. In addition, operating the DC-DC converter at a higher duty cycle for most of the time results in higher power loss and high voltage stress within the phase leg switching devices. Therefore, an improved DC-DC converter is needed that can provide higher voltage gain at reduced duty cycles.

Another potential drawback of conventional interleaved converters is that high current ripple in the inductors creates a larger power loss when the duty cycle D is high. Large inductors have been necessary to limit current ripple, but they are lossy, bulky, and heavy which is undesirable for high power HEV applications.

SUMMARY OF THE INVENTION

In one aspect of the invention, a variable voltage converter in an electric drive system comprises parallel switching legs with respective upper and lower switching devices connected in series between a positive node and a negative node and each having a respective intermediate junction coupled to a battery by a respective inductance. Upper and lower linking capacitors are connected in series between a positive bus and a negative bus of the drive system. A configurable coupler has a first switching device selectably coupling the positive node to the positive bus, a second switching device selectably coupling the positive node to a capacitor junction between the linking capacitors, a third switching device selectably coupling the negative node to the capacitor junction, and a fourth switching device selectably coupling the negative node with the negative bus. A controller is configured to drive the upper and lower switching devices according to PWM gate signals having a duty cycle adapted to provide a target voltage between the buses, and configured to actuate the first through fourth switching devices to selectably steer currents from the switching legs to charge the linking capacitors in series to provide a first voltage gain and to charge the linking capacitors individually to provide a second voltage gain larger than the first voltage gain.

DETAILED DESCRIPTION OF PREFERRED EMBODIMENTS

Figure 1:
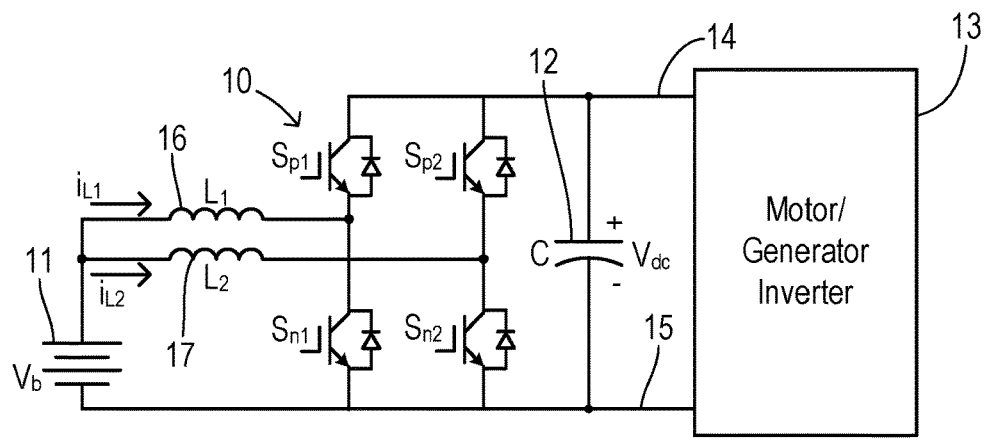
FIG. 1 is a schematic, block diagram showing a conventional interleaved DC-DC converter in an electric drive of a hybrid electric vehicle having independent inductors.

Referring to FIG. 1, a DC-DC variable voltage converter (VVC) 10 is coupled between a DC power source 11 (such as a battery pack or a fuel cell) and a DC link capacitor 12. A positive bus 14 and a negative bus 15 couple link capacitor 12 to a motor/generator inverter system 13. VVC 10 has interleaved phase legs, including a first phase leg having an upper switching device $S_{p1}$ connected in series with a lower switching device $S_{n1}$ between buses 14 and 15. A first inductor 16 couples a junction between switching devices $S_{p1}$ and $S_{n1}$ to battery 11. A second phase leg has an upper switching device $S_{p2}$ connected in series with a lower switching device $S_{n2}$ between buses 14 and 15. A second inductor 17 couples a junction between switching devices $S_{p2}$ and $S_{n2}$ to battery 11.

VVC 10 can work in boost mode or in buck mode with power flow in either direction. Switching devices $S_{p1}$, $S_{n1}$, $S_{p2}$, and $S_{n2}$ in the phase legs work with inductors 16 and 17 (having inductances $L_1$ and $L_2$) in an interleaved way, whereby each inductor and the respective phase leg support half of the battery current (in boost mode). The phase leg switching signals for $S_{p1}$ and $S_{n1}$ (which are inverted from each other) have a 180° phase shift compared with the phase leg switching signals for $S_{p2}$ and $S_{n2}$, which achieves the interleaved operation to significantly reduce battery current ripple. Thus, currents $i_{L1}$ and $i_{L2}$ flowing through inductors 16 and 17 have the same magnitude but are have a 180° phase shift.

Figure 2:
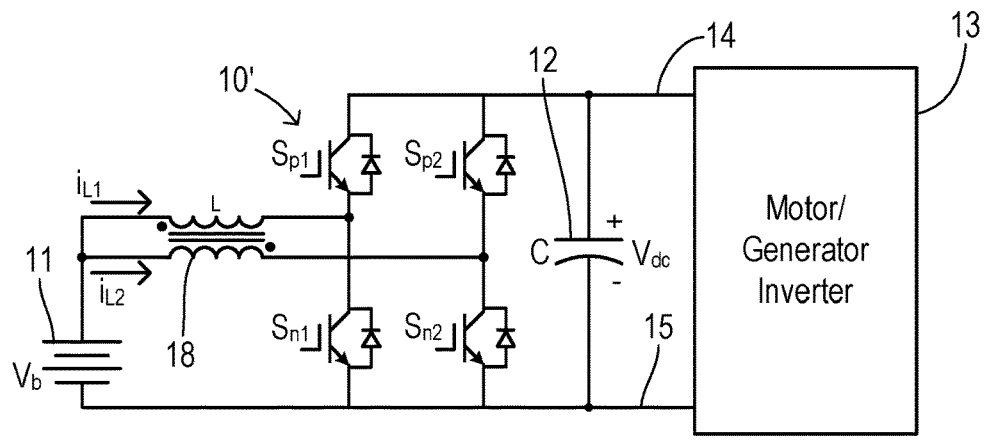
FIG. 2 is a schematic, block diagram showing a conventional interleaved DC-DC converter in an electric drive of a hybrid electric vehicle having coupled inductors.

In FIG. 1, inductors 16 and 17 operate independently without any cross coupling. In FIG. 2, inductively coupled coils of a transformer 18 provide the inductances for each phase leg. By inductively coupling the inductances feeding the phase legs, a smaller overall size of the inductors can be obtained.

Each of the switching devices in VVC 10 are preferably comprised of an insulated-gate bipolar transistor (IGBT). Each IGBT has a respective control (e.g., base) terminal coupled to a controller (not shown) which controls the switches according to various operating modes of the converter. The controller may be comprised of a motor-generator control unit (MGCU) of a type that is commercially available and as described in U.S. Pat. No. 9,106,162, issued Aug. 11, 2015, which is incorporated herein by reference in its entirety.

Figure 3:
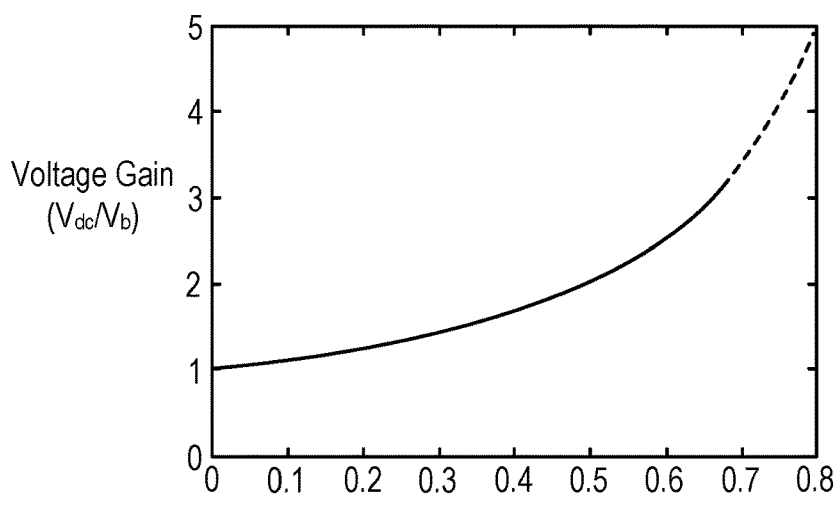
FIG. 3 is a graph showing typical useful voltage gain using a conventional interleaved converter.

In order to obtain a desired voltage gain from VVC 10, a well-known pulse width modulation (PWM) method is typically used to generate gate signals for the IGBT switching devices. The voltage gain G (e.g., from battery voltage $V_b$ to the DC-link voltage $V_{dc}$) is defined as $$G = \frac{V_{dc}}{V_b} = \frac{1}{(1-D)},$$

where the duty cycle D is the percentage of ON-time of the lower switching device of the phase legs. As shown in FIG. 3, gain G gradually increases from 1.0 as the duty cycle increase from zero. However, the known converter cannot provide significant useful gain above about three.

Figure 4:
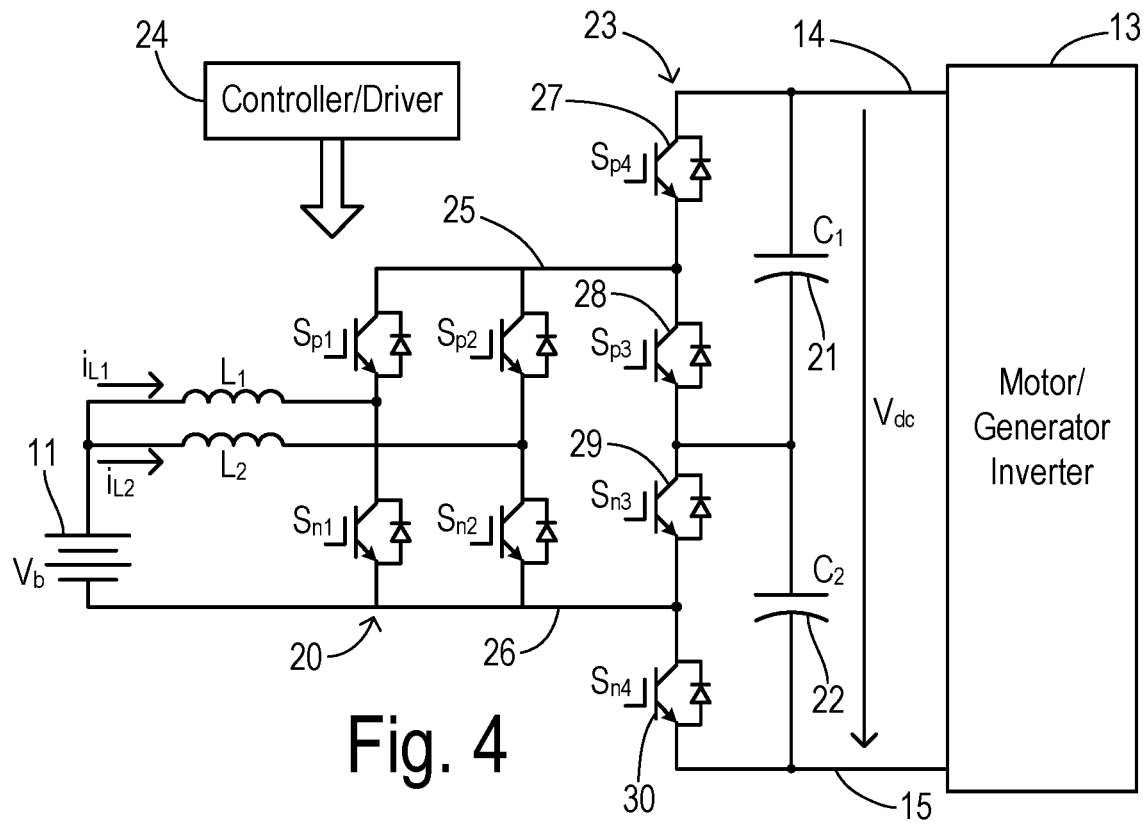
FIG. 4 is a schematic, block diagram showing an interleaved DC-DC converter according to one embodiment of the invention having independent inductors.

As shown by a first preferred embodiment of the invention illustrated in FIG. 4, an improved variable voltage DC-DC 20 converter includes interleaved phase legs providing currents that are steered by a configurable coupler 23 to a split DC link capacitor having an upper capacitor 21 in series with a lower capacitor 22 between buses 14 and 15. By selectably steering currents from the phase legs to one or the other of capacitors 21 and 22 (i.e., to charge them separately), the voltage gain obtainable by converter 20 is doubled. Thus, the bus voltage $V_{dc}$ can be controlled to achieve a target voltage twice as high as could be otherwise obtained. In the present invention, coupler 23 selectably steers currents from the switching legs to charge the linking capacitors in series to provide a first voltage gain (e.g., a gain less than 2), and selectably steers currents from the switching legs to charge the linking capacitors individually when targeting a voltage necessitating a second voltage gain larger than the first voltage gain. Capacitances $C_1$ and $C_2$ of capacitors 21 and 22 are equal, and capacitors 21 and 22 have an identical voltage rating.

Figure 5:
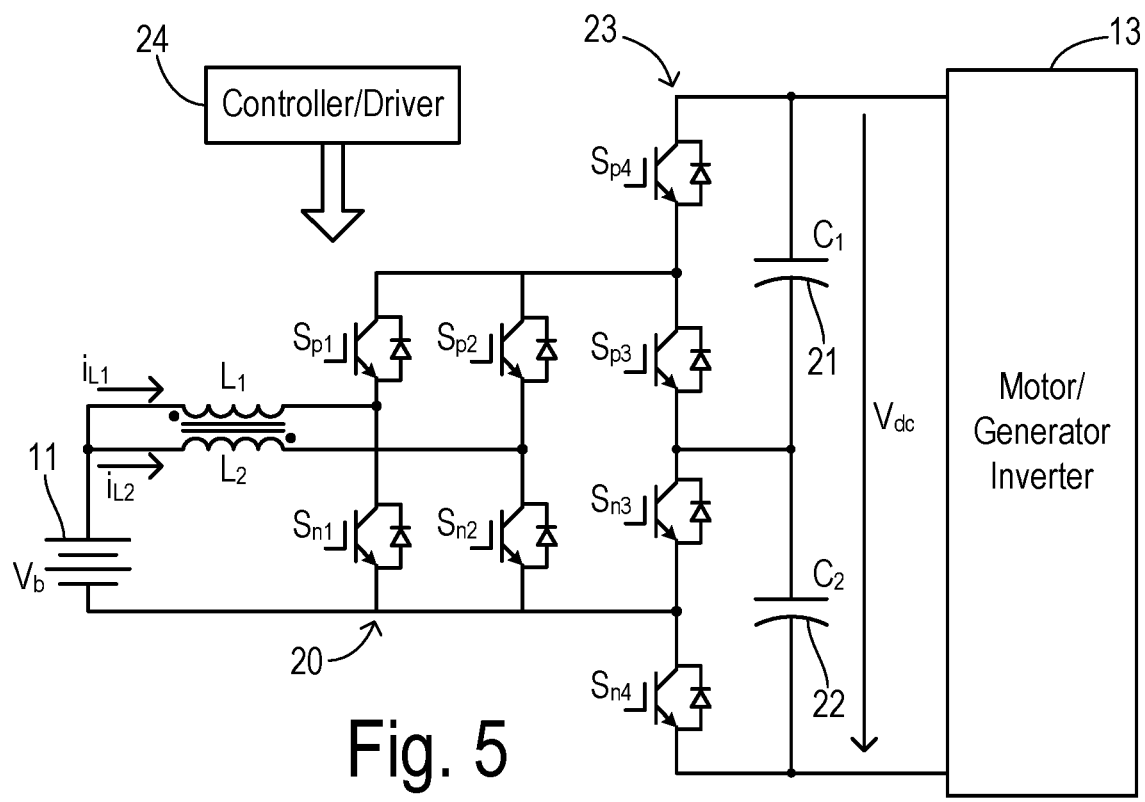
FIG. 5 is a schematic, block diagram showing an interleaved DC-DC converter according to one embodiment of the invention having coupled inductors.

A controller/driver 24 provides PWM switching signals to the phase leg switching devices and steering signals to actuate switching devices in coupler 23. In the invention, the phase legs are coupled between a positive node 25 and a negative node 26. Configurable coupler 23 is a switching array having a first switching device 27 ($S_{p4}$) selectably coupling positive node 25 to positive bus 14, a second switching device 28 ($S_{p3}$) selectably coupling positive node 25 to a capacitor junction between linking capacitors 21 and 22, a third switching device 29 ($S_{n3}$) selectably coupling negative node 26 to the capacitor junction, and a fourth switching device 30 ($S_{n4}$) selectably coupling negative node 26 with negative bus 15. FIG. 4 shows an embodiment wherein independent inductors $L_1$ and $L_2$ coupled the phase legs to battery 11, while FIG. 5 shows an embodiment that uses inductive coupling between the inductors but is otherwise identical.

The layout of coupler 23 and capacitors 21 and 22 have the flexibility to selectably steer currents from the phase legs to charge the capacitors either separately or together. Therefore, controller 24 can operate converter 20 according to several different modulation modes in order to provide an expanded range of available voltage gains while consistently achieving low power losses.

Figure 6:
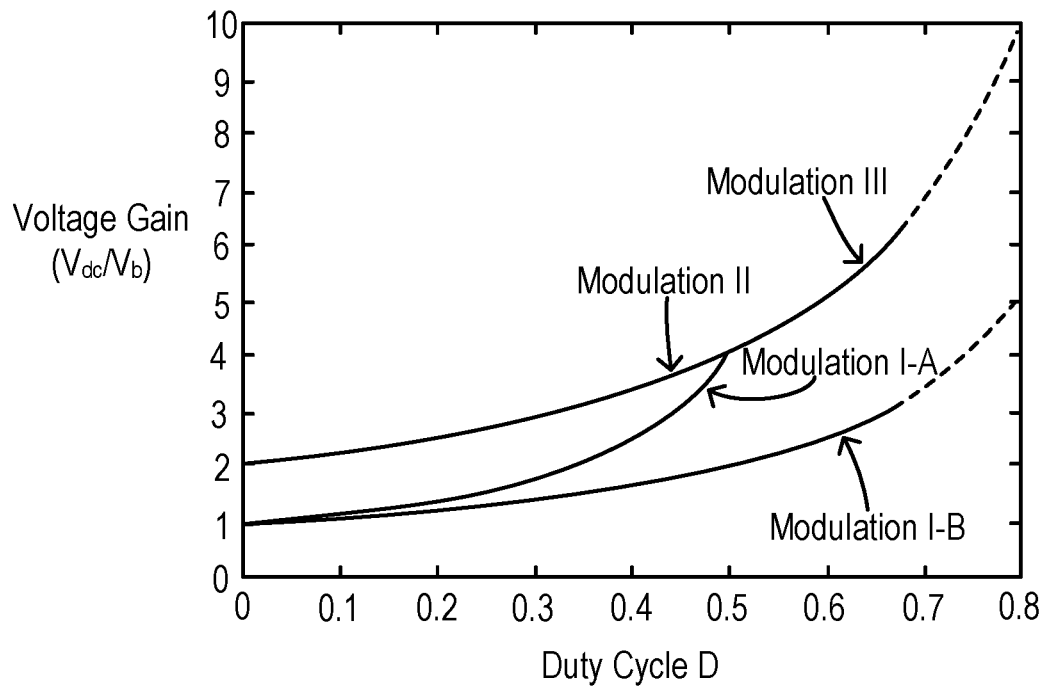
FIG. 6 is a graph showing voltage gain according to a plurality of modulation modes implemented according to various embodiments of the invention.

FIG. 6 shows voltage gain versus duty cycle curves for each of the different modulation modes disclosed below. By switching between modes according to the targeted (i.e., desired) voltage gain at any particular time, an optimized power flow and efficiency can be obtained. Thus, for a voltage gain in a range from 1 to about 2, either a Mode I-A or a Mode I-B (described below) can be used according to which one is estimated to result in smaller power losses depending on various factors of a particular design such as i) voltage stress and current levels in each switching device, ii) the switching frequency, iii) the I-V curve, $E_{on}$, $E_{off}$, and $E_{rr}$ of the switching devices, and iv) properties of the gate driver circuits. For a voltage gain in a range from about 2 to about 4, a modulation Mode II is used. For a voltage gain greater than about 4, a modulation Mode III is used. Coupler 23 can also be set to a configuration that allows the use of a conventional pass-through mode when the desired voltage gain is 1.

Figure 7:
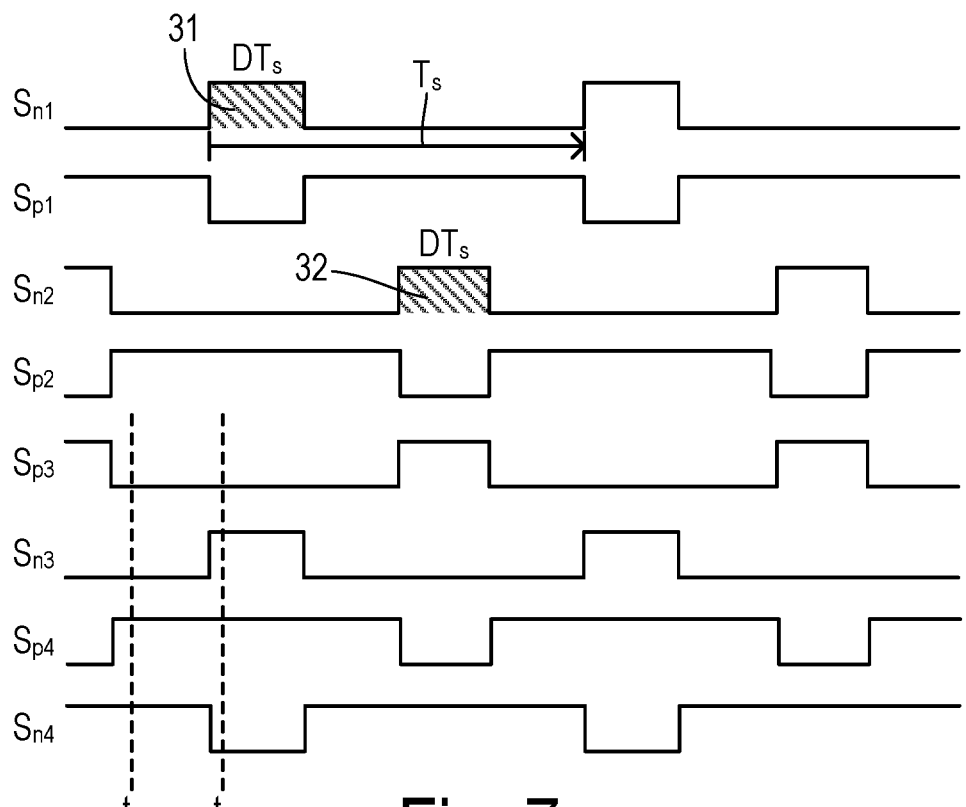
FIG. 7 is a signal diagram showing phase leg PWM signals and coupler steering signals for a modulation Mode I-A of the invention.

FIG. 7 illustrates Mode I-A. PWM switching signals for driving phase leg switches $S_{p1}$, $S_{n1}$, $S_{p2}$, and $S_{n2}$ are shown wherein pulses 31 and 32 represent the ON-states for lower switching devices $S_{n1}$ and $S_{n2}$. Pulses 31 and 32 have an ON time $D \cdot T_S$ which is a portion of the cycle time $T_S$. Mode I-A is restricted to using a duty cycle D less than about 0.5. As known in the prior art, the width of pulses 31 and 32 are obtained by comparing duty cycle D with a triangle-wave carrier signal. Gate actuation signals are shown for coupler switches $S_{p3}$, $S_{n3}$, $S_{p4}$, and $S_{n4}$ which are configured to charge both capacitors 21 and 22 in series part of the time (e.g., during times that both upper phase leg switches $S_{p1}$ and $S_{p2}$ are ON) and to charge only one of capacitors 21 or 22 alone during part of the time (e.g., when a corresponding one of the lower phase leg switches $S_{n1}$ or $S_{n2}$ is ON). The resulting output voltage is as follows:

$$V_{dc} = \frac{V_b}{(1-1.5\,D)}$$

Figure 8:
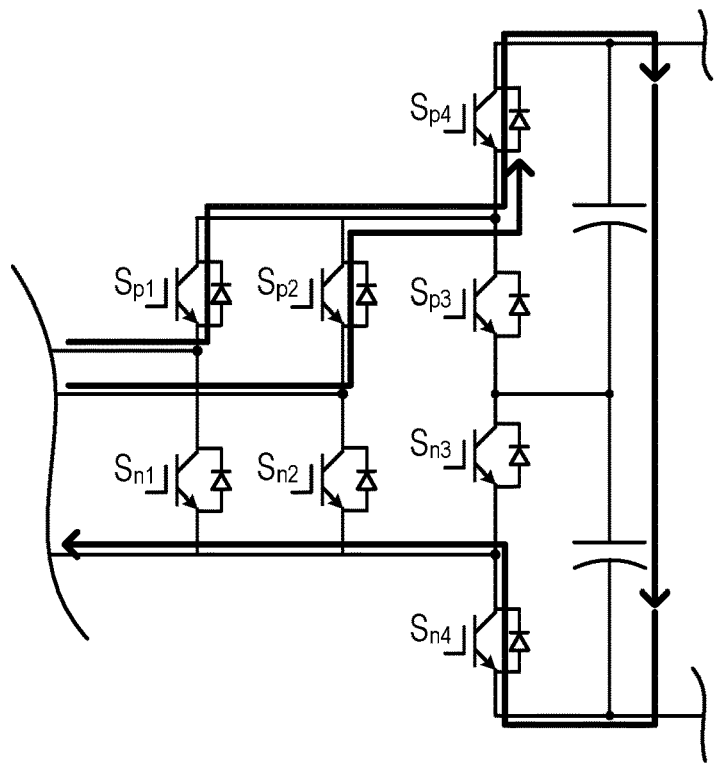
FIGS. 8 and 9 are schematic diagrams of the invention showing current flow during different portions of a switching cycle according to modulation Mode I-A.
Figure 9:
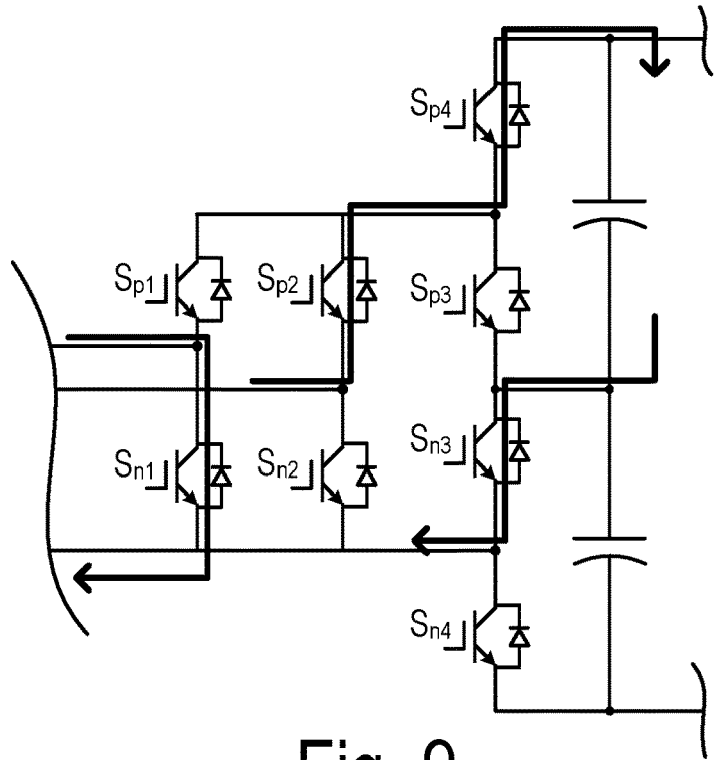

Current flow according to Mode I-A at a time $t_1$ (FIG. 7) is shown in FIG. 8 wherein current from both phase legs are applied across both link capacitors in series simultaneously. Current flow according to Mode I-A at a later time $t_2$ (FIG. 7) is shown in FIG. 9 wherein current from one phase leg is steered to charge only the upper link capacitor alone (i.e., while the inductor for the other phase leg is being replenished). Similarly, the lower link capacitor is charged alone later in the cycle from the opposite phase leg.

Figure 10:
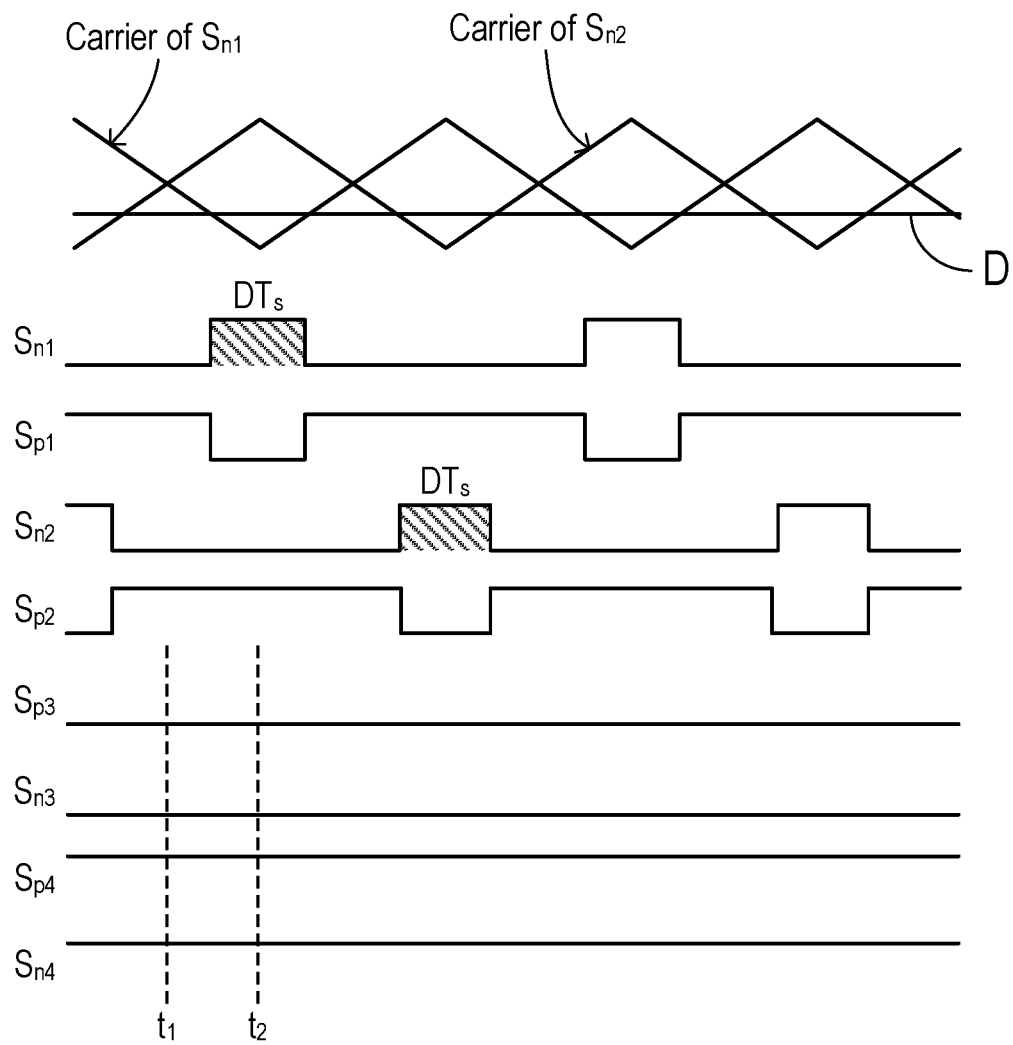
FIG. 10 is a signal diagram showing phase leg PWM signals and coupler steering signals for a modulation Mode I-B of the invention.
Figure 11:
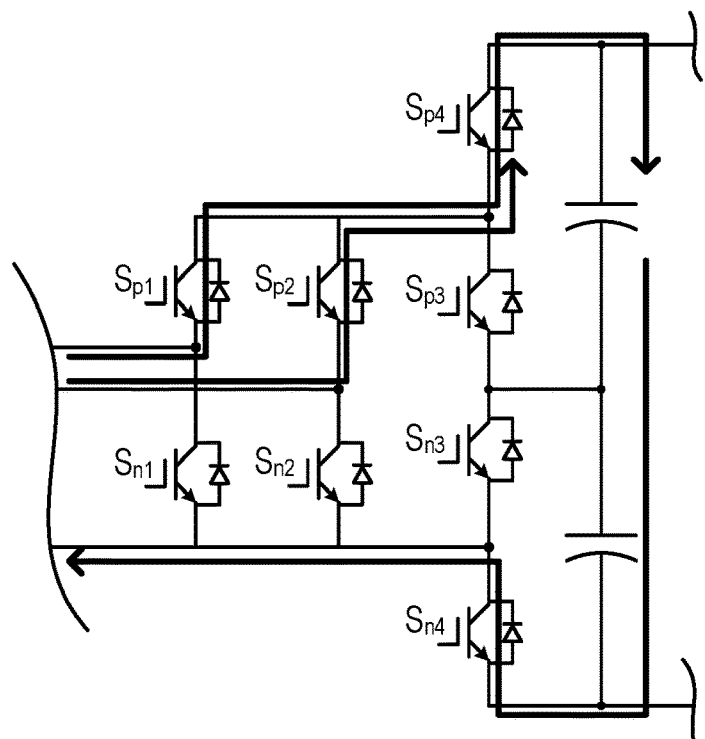
FIGS. 11 and 12 are schematic diagrams of the invention showing current flow during different portions of a switching cycle according to modulation Mode I-B.
Figure 12:
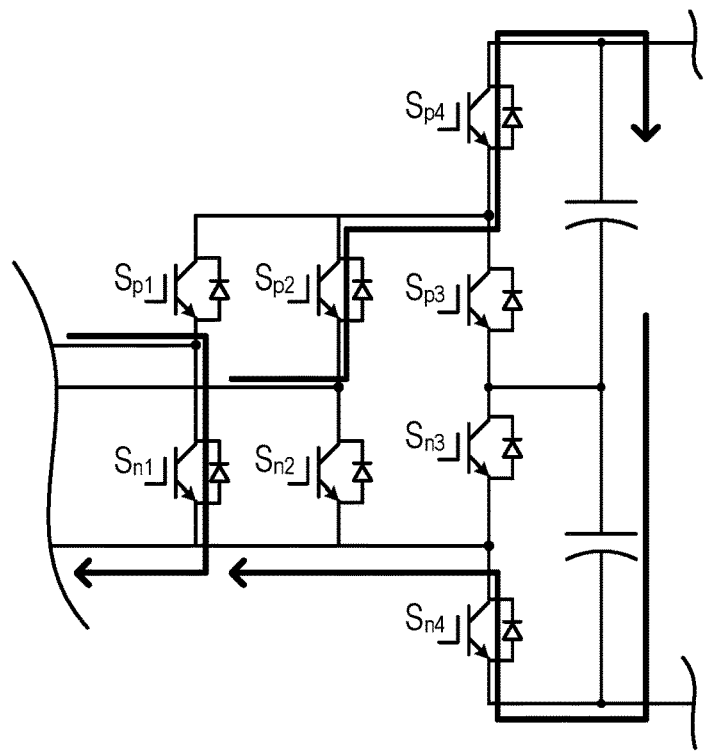

FIG. 10 illustrates Mode I-B wherein the PWM switching signals for the phase legs are shown. The configuration of the switching devices in coupler 23 for Mode I-B simulates the conventional converter by continuously connecting both upper phase leg switching devices $S_{p1}$ and $S_{p2}$ to positive bus 14 and connecting both lower phase leg switching devices $S_{n1}$ and $S_{n2}$ to negative bus 15. Thus, at a time $t_1$ when both upper phase leg switches $S_{p1}$ and $S_{p2}$ are ON, both link capacitors are charged in series from both phase legs as shown in FIG. 11. At other times (such as $t_2$ in FIG. 10) when one of the upper phase leg switches $S_{p1}$ and $S_{p2}$ is OFF, both link capacitors are charged in series from just one phase leg as shown in FIG. 12. The resulting output voltage is as follows:

$$V_{dc} = \frac{V_b}{(1-D)}$$

Figure 13:
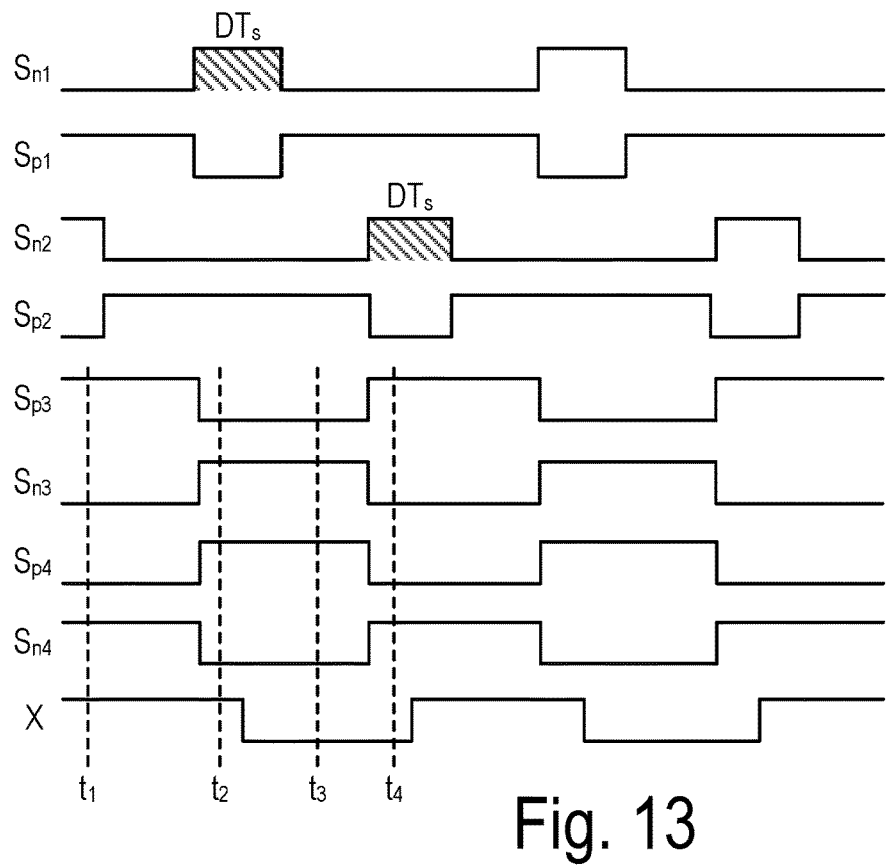
FIG. 13 is a signal diagram showing phase leg PWM signals and coupler steering signals for a modulation Mode II of the invention.
Figure 14:
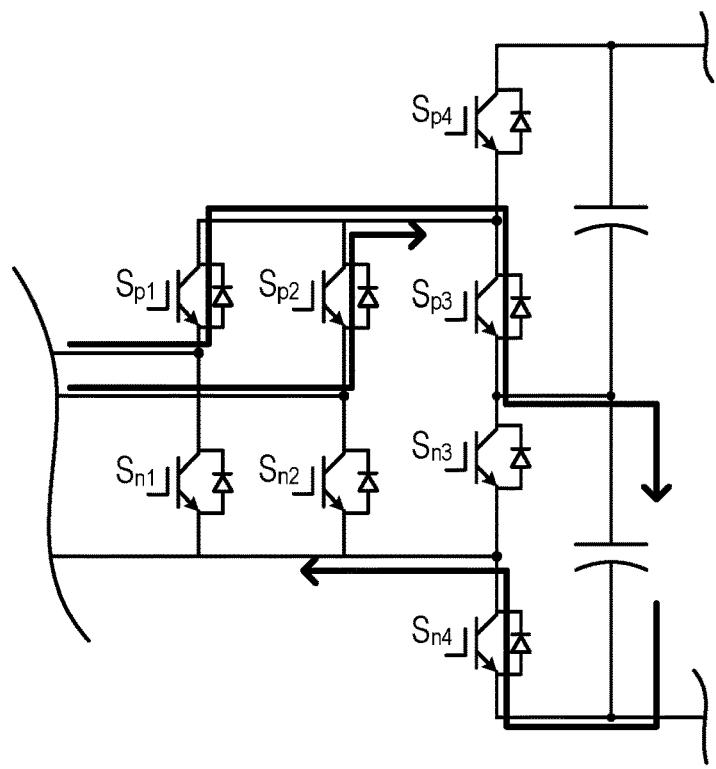
FIGS. 14-17 are schematic diagrams of the invention showing current flow during different portions of a switching cycle according to modulation Mode II.
Figure 15:
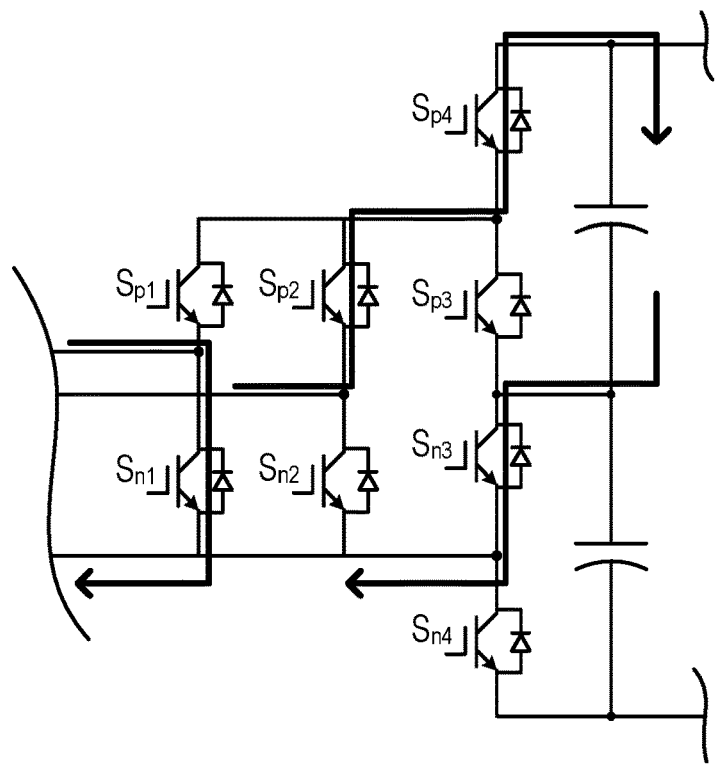
Figure 16:
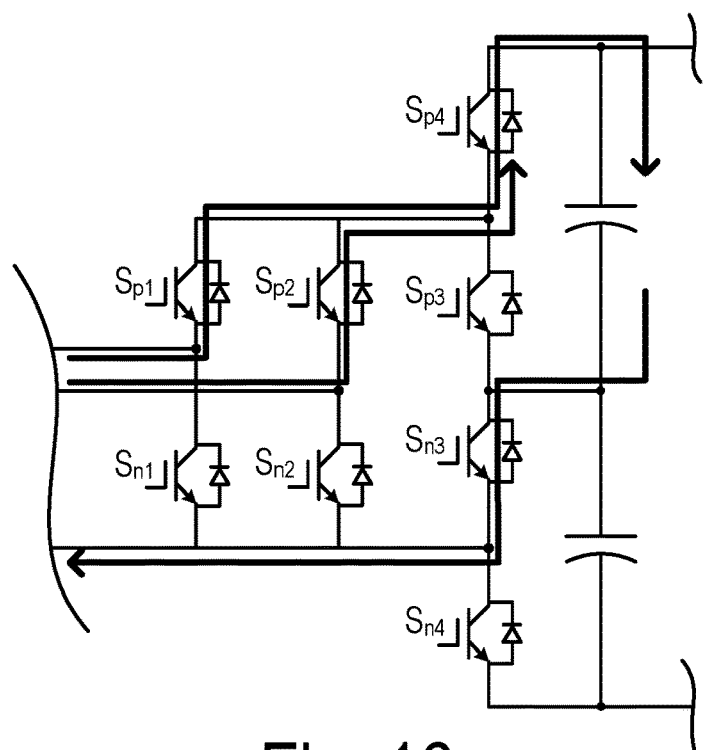
Figure 17:
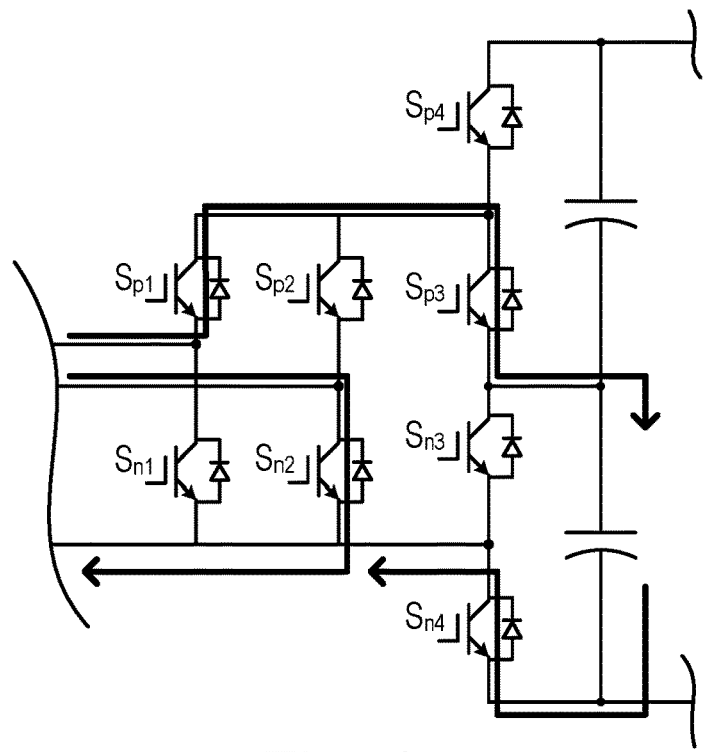

In Mode II (i.e., when the target voltage gain is between $2 \cdot V_b$ and $4 \cdot V_b$), the link capacitors are only charged separately. FIG. 13 shows the pattern of actuation signals for coupler switching devices $S_{p3}$, $S_{n3}$, $S_{p4}$, and $S_{n4}$ in Mode II. Mode II charges the upper linking capacitor alone from both phase legs for part of the time as shown in FIG. 16. Mode II charges the upper linking capacitor alone from only the second phase leg for part of the time as shown in FIG. 15. Mode II charges the lower linking capacitor alone from both phase legs for part of the time as shown in FIG. 14. And finally, Mode II charges the lower linking capacitor alone from only the first phase leg for part of the time as shown in FIG. 17. As a result, a phase leg current is being steered to at least one capacitor at all times. In Mode II, the duty cycle is in the range 0≤D<1. Actuation signal $S_{p3}$ can be obtained by the following logic operation:

$$S_{p3} = \overline{S}_{n1}(X + S_{n2} \cdot \overline{X})$$

where X is related to the carrier waveform as shown in FIG. 13.

Figure 18:
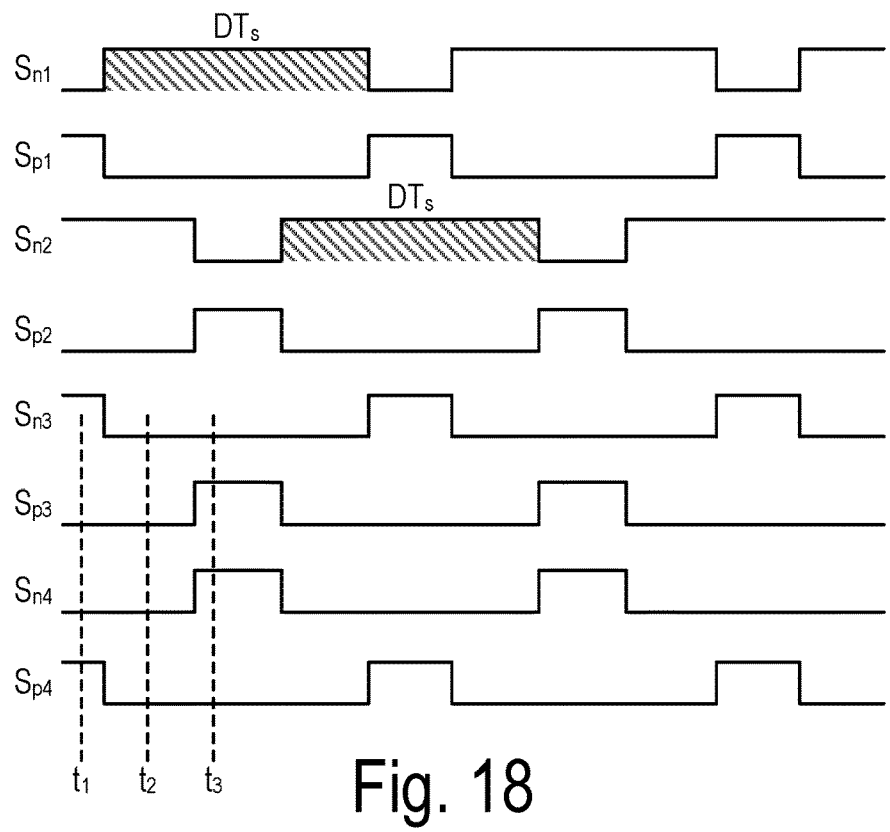
FIG. 18 is a signal diagram showing phase leg PWM signals and coupler steering signals for a modulation Mode III of the invention.

In Mode III (i.e., when the target voltage gain is greater than $4 \cdot V_b$), the link capacitors are charged separately as in Mode II. In Mode III, however, there are times when switching devices $S_{p3}$, $S_{n3}$, $S_{p4}$, and $S_{n4}$ are all OFF and no charging current is steered to the capacitors. Furthermore, Mode III is preferably used only with duty cycle D greater than or equal to 0.5. FIG. 18 shows the pattern of actuation signals for coupler switching devices $S_{p3}$, $S_{n3}$, $S_{p4}$, and $S_{n4}$ in Mode III. Mode III charges the upper linking capacitor alone from only one of the switching legs for part of the time, and charges the lower linking capacitor alone from only one of the switching legs for part of the time.

Figure 19:
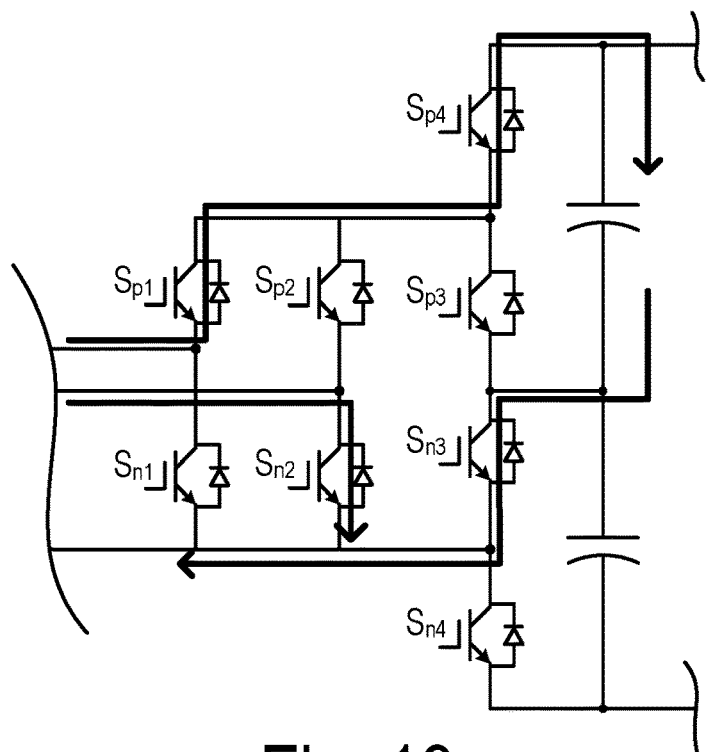
FIGS. 19 and 20 are schematic diagrams of the invention showing current flow during different portions of a switching cycle according to modulation Mode III.
Figure 20:
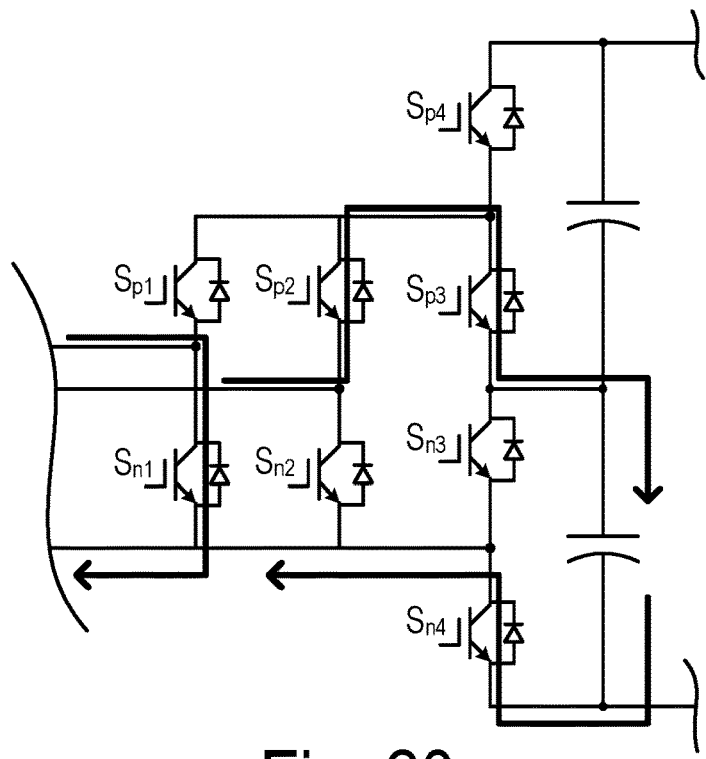
Figure 21:
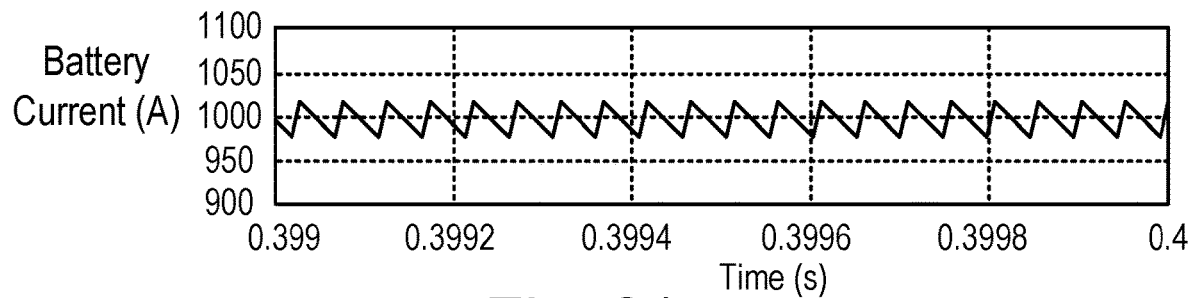
FIG. 21 is a graph showing battery current ripple during operation in Mode III to obtain a high voltage gain.

Current flow according to Mode III at a time $t_1$ (FIG. 18) is shown in FIG. 19 wherein current from the first phase leg ($S_{p1}$) is applied across the upper link capacitor alone. At a later time $t_2$ (when neither phase leg is outputting any current), switching devices $S_{p3}$, $S_{n3}$, $S_{p4}$, and $S_{n4}$ are all OFF and no charging current is supplied to the capacitors. Current flow according to Mode III at a later time $t_3$ (FIG. 18) is shown in FIG. 20 wherein current from the second phase leg ($S_{p2}$) is applied across the lower link capacitor alone. As in Mode II, the resulting output voltage is as follows:

$$V_{dc} = \frac{2V_b}{(1-D)}.$$

Figure 22:
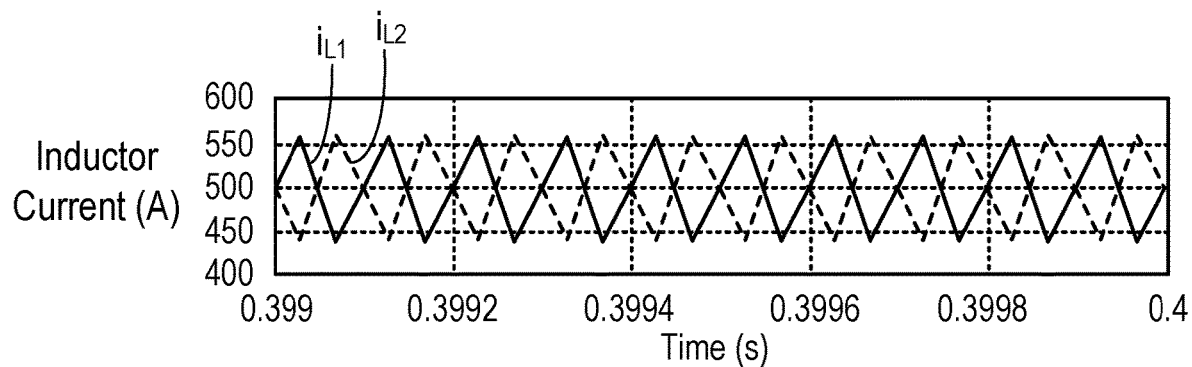
FIG. 22 is a graph showing current ripple in the inductors coincident with the operation in FIG. 21.
Figure 23:
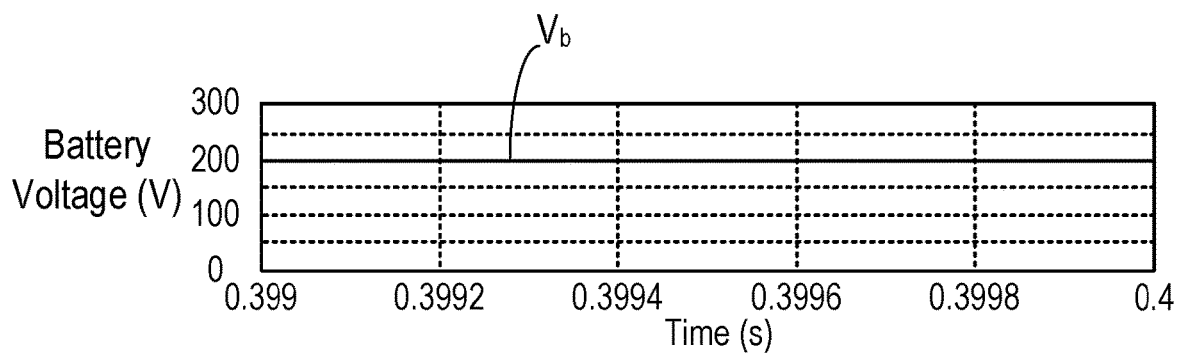
FIG. 23 is a graph showing battery voltage coincident with FIG. 21.
Figure 24:
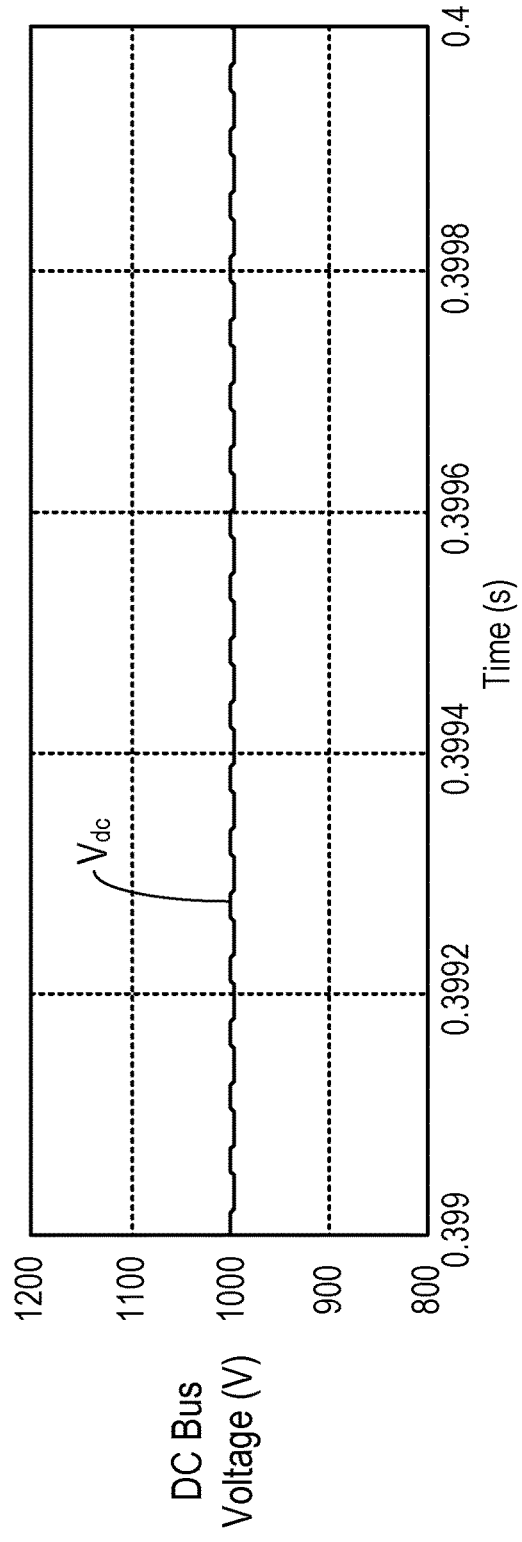
FIG. 24 is a graph showing DC link voltage coincident with FIG. 21.
Figure 25:
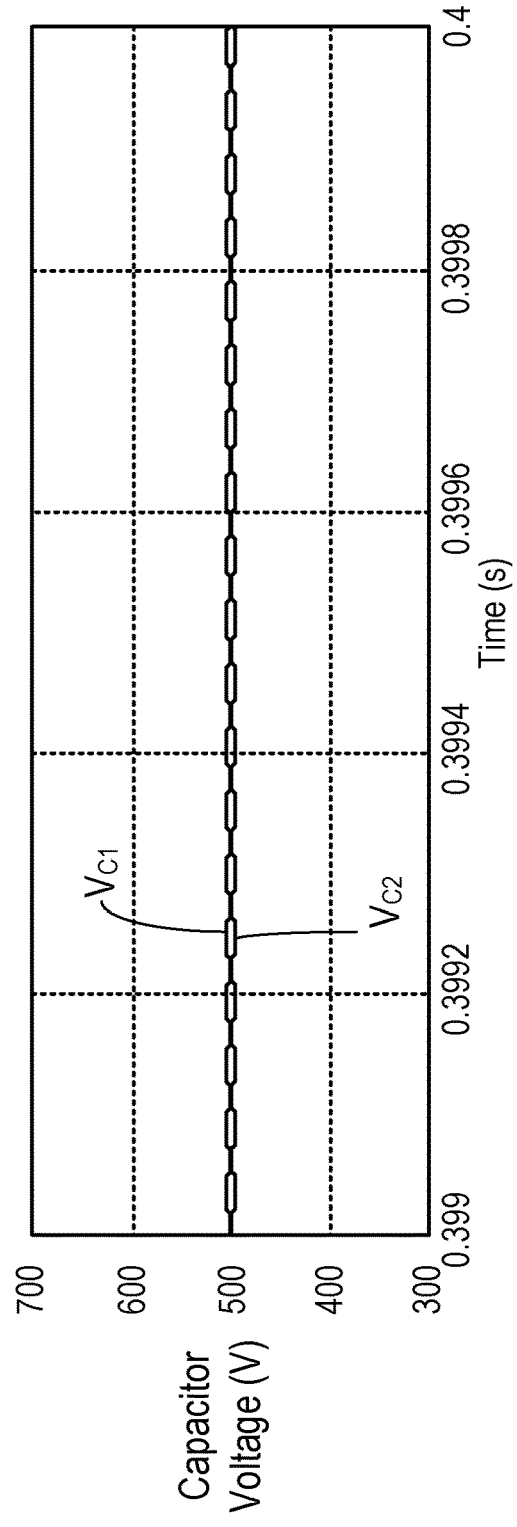
FIG. 25 is a graph showing voltages across each of the DC link capacitors coincident with FIG. 21.

Simulated results for Mode III are shown in FIGS. 21-25 based on an embodiment wherein $L_1=L_2=100$ μH; $C_1=C_2=800$ μF; $V_b=200$ V; and the DC bus voltage is boosted to 1000 V (i.e., the voltage gain is 5 and the duty cycle is 0.6). Battery current (FIG. 21) has an average value of 998 A with a 40 A peak-to-peak ripple, even though each inductor current ripple is 120 A peak-peak (FIG. 22). Thus, there is a dramatic ripple reduction of battery current in the invented converter when compared with the inductor current ripple. Each phase leg and its inductor only carry 499 A average current which is half of battery current. The overall DC bus voltage of 1000 V is steady (FIG. 24) and is well balanced between the two capacitors (FIG. 25), each of which maintains 500 V. Thus, battery current ripple is very low even though the inductances are kept small. The smaller inductor sizes results in lower inductor losses, small packaging size, and lower cost.

Although the DC-DC converter illustrated above has two phase legs, the invention is not so limited. The invention is easily extended to converters with three or more interleaved phase legs, which would result in even higher current, lower ripple, and higher voltage gains.

What is claimed is:

1. A variable voltage converter in an electric drive system, comprising;
    parallel switching legs with respective upper and lower switching devices connected in series between a positive node and a negative node and each having a respective intermediate junction coupled to a battery by a respective inductance;
    upper and lower linking capacitors connected in series between a positive bus and a negative bus of the drive system;
    a configurable coupler having a first switching device selectably coupling the positive node to the positive bus, a second switching device selectably coupling the positive node to a capacitor junction between the linking capacitors, a third switching device selectably coupling the negative node to the capacitor junction, and a fourth switching device selectably coupling the negative node with the negative bus; and
    a controller configured to drive the upper and lower switching devices according to PWM gate signals having a duty cycle adapted to provide a target voltage between the buses, and configured to actuate the first through fourth switching devices to selectably steer currents from the switching legs to charge the linking capacitors in series to provide a first voltage gain and to charge the linking capacitors individually to provide a second voltage gain larger than the first voltage gain.

2. The converter of claim 1 wherein the battery supplies a battery voltage $V_b$, and wherein the controller actuates the configurable coupler according to a plurality of modes including:
    a first mode used when the target voltage is less than $2 \cdot V_b$, wherein the first mode charges both linking capacitors in series from both switching legs simultaneously for part of the time, and wherein the first mode charges both linking capacitors in series from only one of the switching legs for part of the time; and
    a second mode used when the target voltage is between $2 \cdot V_b$ and $4 \cdot V_b$, wherein the second mode charges the upper linking capacitor alone from both switching legs for part of the time, wherein the second mode charges the upper linking capacitor alone from only one of the switching legs for part of the time, wherein the second mode charges the lower linking capacitor alone from both switching legs for part of the time, and wherein the second mode charges the lower linking capacitor alone from only one of the switching legs for part of the time.

3. The converter of claim 2 wherein the first mode restricts the duty cycle to less than about 0.5, wherein the first mode charges the upper linking capacitor alone from only one of the switching legs for part of the time, and wherein the first mode charges the lower linking capacitor alone from only the other one of the switching legs for part of the time.

4. The converter of claim 2 wherein the second mode excludes charging both linking capacitors in series.

5. The converter of claim 2 wherein the plurality of modes further includes:
    a third mode used when the target voltage is greater than $4 \cdot V_b$, wherein the third mode charges the upper linking capacitor alone from only one of the switching legs for part of the time, wherein the third mode charges the lower linking capacitor alone from only one of the switching legs for part of the time.

6. The converter of claim 2 wherein the plurality of modes further includes:
    a pass-through mode used when the target voltage is not greater than $V_b$, wherein the pass-through mode has the duty cycle set to zero, and wherein the first and fourth switching devices are actuated and the second and third switching devices are deactuated.

7. The converter of claim 1 wherein the respective inductances are inductively coupled.

8. The converter of claim 1 wherein the switching devices are comprised of insulated gate bipolar transistors.

9. A method of controlling a variable voltage converter coupled between a battery and a DC link, wherein upper and lower linking capacitors are connected in series across the DC link, the method comprising the steps of:
    determining a target voltage to be output by the converter;
    when a target voltage on the DC link is less than two times a voltage of the battery, charging the capacitors in a first mode wherein both linking capacitors are charged in series from both switching legs simultaneously for part of the time, and wherein both linking capacitors are charged in series from only one of the switching legs for part of the time; and
    when the target voltage is between 2 and 4 times the voltage of the battery, charging the capacitors in a second mode wherein the upper linking capacitor is charged alone from both switching legs for part of the time, wherein the upper linking capacitor is charged alone from only one of the switching legs for part of the time, wherein the lower linking capacitor is charged alone from both switching legs for part of the time, and wherein the lower linking capacitor is charged alone from only one of the switching legs for part of the time.

10. The method of claim 9 wherein the second mode excludes charging both linking capacitors in series.

11. The method of claim 9 wherein the first mode restricts the duty cycle to less than about 0.5, wherein the first mode further includes charging the upper linking capacitor alone from only one of the switching legs for part of the time and charging the lower linking capacitor alone from only the other one of the switching legs for part of the time.

12. The method of claim 9 further comprising the step of:
    when the target voltage is greater than 4 times the voltage of the battery, charging the capacitors in a third mode wherein the upper linking capacitor is charged alone from only one of the switching legs for part of the time, and wherein the lower linking capacitor is charged alone from only one of the switching legs for part of the time.

13. The method of claim 9 further comprising the step of:
when the target voltage is not greater than the voltage of the battery, charging the capacitors in a pass-through mode wherein the duty cycle set to zero and wherein both linking capacitors are exclusively charged in series simultaneously.

14. An electrified vehicle voltage converter, comprising;
two interleaved phase legs coupled to a battery;
series-connected upper and lower linking capacitors; and
a coupler device selectably steering currents from the switching legs to charge the linking capacitors in series for part of the time and individually for part of the time according to a voltage gain desired between a voltage of the battery and a voltage across the linking capacitors.

15. The converter of claim 14 wherein the coupler steers charging currents according to a plurality of modes including:
a first mode used when a target voltage across the linking capacitors is less than $2 \cdot V_b$, wherein $V_b$ is the voltage of the battery, wherein the first mode charges both linking capacitors in series from both phase legs simultaneously for part of the time, and wherein the first mode charges both linking capacitors in series from only one of the phase legs for part of the time; and
a second mode used when the target voltage is between $2 \cdot V_b$ and $4 \cdot V_b$, wherein the second mode charges the upper linking capacitor alone from both phase legs for part of the time, wherein the second mode charges the upper linking capacitor alone from only one of the phase legs for part of the time, wherein the second mode charges the lower linking capacitor alone from both phase legs for part of the time, and wherein the second mode charges the lower linking capacitor alone from only one of the phase legs for part of the time.

16. The converter of claim 15 wherein the first mode restricts a duty cycle for controlling the phase legs to less than about 0.5, wherein the first mode charges the upper linking capacitor alone from only one of the phase legs for part of the time, and wherein the first mode charges the lower linking capacitor alone from only the other one of the phase legs for part of the time.

17. The converter of claim 15 wherein the plurality of modes further includes:
a third mode used when the target voltage is greater than $4 \cdot V_b$, wherein the third mode charges the upper linking capacitor alone from only one of the phase legs for part of the time, and wherein the third mode charges the lower linking capacitor alone from only one of the phase legs for part of the time.

18. The converter of claim 15 wherein the plurality of modes further includes:
a pass-through mode used when the target voltage is not greater than $V_b$, wherein the pass-through mode has a duty cycle for controlling the phase legs set to zero, and wherein both linking capacitors are exclusively charged in series simultaneously.

* * * * *